(12) United States Patent
LeBlanc

(10) Patent No.: US 8,174,981 B2
(45) Date of Patent: *May 8, 2012

(54) LATE FRAME RECOVERY METHOD

(75) Inventor: Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/326,613

(22) Filed: Dec. 2, 2008

(65) Prior Publication Data

US 2009/0080415 A1 Mar. 26, 2009

Related U.S. Application Data

(63) Continuation of application No. 11/674,442, filed on Feb. 13, 2007, now Pat. No. 7,460,479, which is a continuation of application No. 10/082,749, filed on Feb. 25, 2002, now Pat. No. 7,177,278, which is a continuation-in-part of application No. 09/522,185, filed on Mar. 9, 2000, now Pat. No. 7,423,983, which is a continuation-in-part of application No. 09/493,458, filed on Jan. 28, 2000, now Pat. No. 6,549,587, which is a continuation-in-part of application No. 09/454,219, filed on Dec. 9, 1999, now Pat. No. 6,882,711.

(51) Int. Cl.
*H04J 3/14* (2006.01)

(52) U.S. Cl. ......... 370/235; 370/506; 704/503; 704/278

(58) Field of Classification Search .......... 370/235–236, 370/320, 335, 342, 441, 412–429; 704/278, 704/503

See application file for complete search history.

(56) References Cited

U.S. PATENT DOCUMENTS 2,881,254 A * 4/1959 Gallagher et al. ............ 379/149
4,726,019 A 2/1988 Adelmann et al.
(Continued)

FOREIGN PATENT DOCUMENTS

WO 99/59282 A2 11/1999
(Continued)

OTHER PUBLICATIONS

Montgomery, W. A., "Techniques for Packet Voice Synchronization," IEEE Journal on selected areas in communications, IEEE Inc., New York, NY, USA, vol. SAC-1, No. 6, pp. 1022-1028, Dec. 1, 1983, XP000563228.

*Primary Examiner* — Phuc Tran
(74) *Attorney, Agent, or Firm* — Thomas, Kayden, Horstemeyer & Risley, LLP

(57) ABSTRACT

Method of processing a transmitted encoded media data stream is received. If a data element arrives prior to, or at, a predetermined playout deadline, the data element is decoded, the media represented by the decoded data element is played, and the data element is provided to a decoder state machine to update a decoder state. If a data element arrives after the predetermined playout deadline, the data element is provided to the decoder state machine to update the decoder state. In one embodiment, if the specified data element fails to arrive by the playout deadline, a subsequently received data element is saved in memory. Then, if the specified data element arrives after the predetermined playout deadline, the specified data element and the saved, subsequently received, data element are provided to the decoder state machine to update the decoder state.

44 Claims, 8 Drawing Sheets

U.S. PATENT DOCUMENTS

| | | |
|---|---|---|
| 5,881,245 A | 3/1999 | Thompson |
| 6,072,830 A | 6/2000 | Proctor et al. |
| 6,377,931 B1 | 4/2002 | Shlomot |
| 6,598,228 B2 * | 7/2003 | Hejna, Jr. .................. 725/91 |
| 6,721,327 B1 | 4/2004 | Ekudden et al. |
| 6,850,252 B1 | 2/2005 | Hoffberg |
| 7,047,190 B1 * | 5/2006 | Kapilow .................. 704/228 |
| 7,177,278 B2 * | 2/2007 | LeBlanc .................. 370/235 |
| 7,460,479 B2 * | 12/2008 | LeBlanc .................. 370/235 |
| 2002/0151992 A1 | 10/2002 | Hoffberg et al. |

FOREIGN PATENT DOCUMENTS

| | | |
|---|---|---|
| WO | 00/30356 A1 | 5/2000 |
| WO | 00/62501 A2 | 10/2000 |
| WO | 00/63881 A1 | 10/2000 |

* cited by examiner

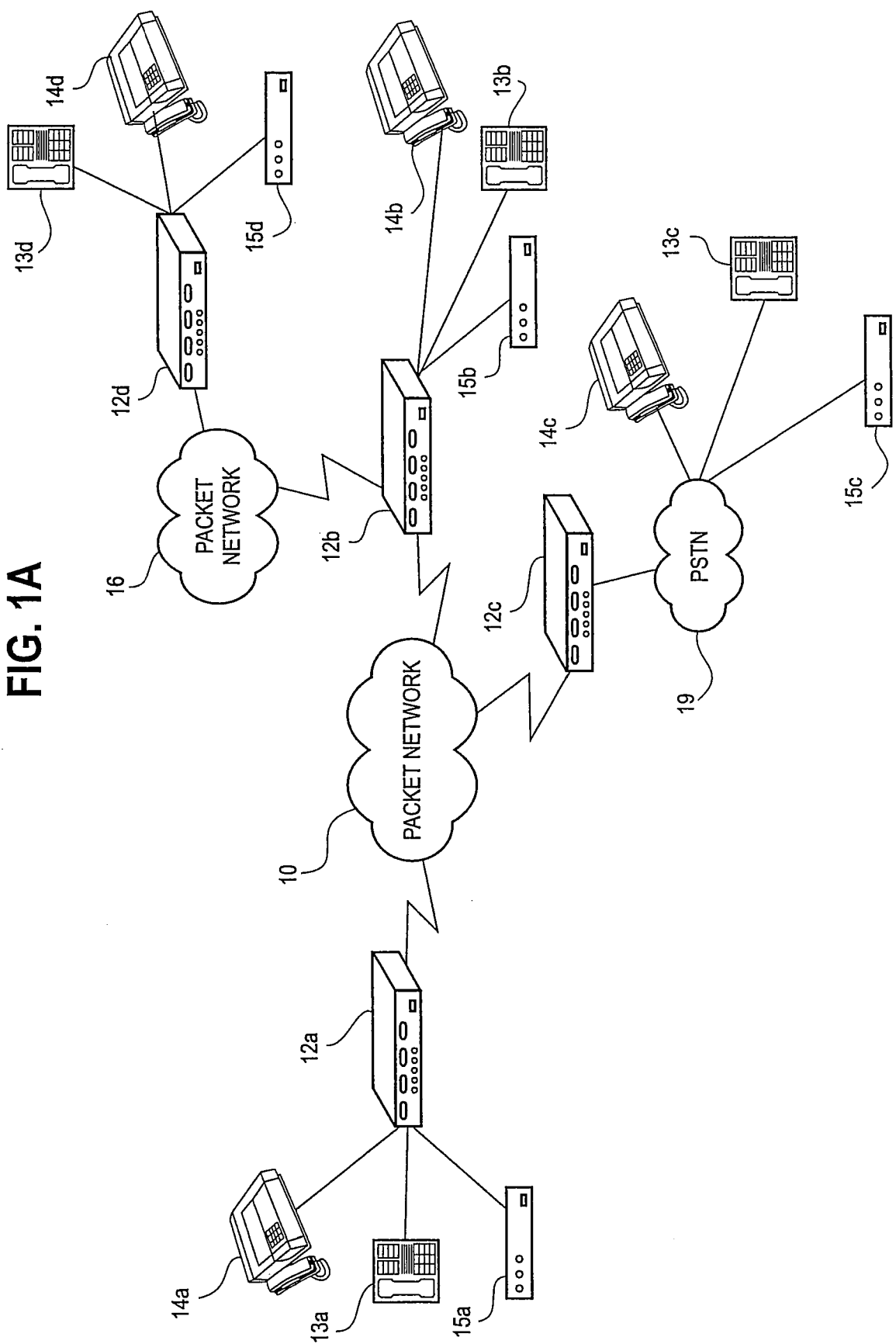

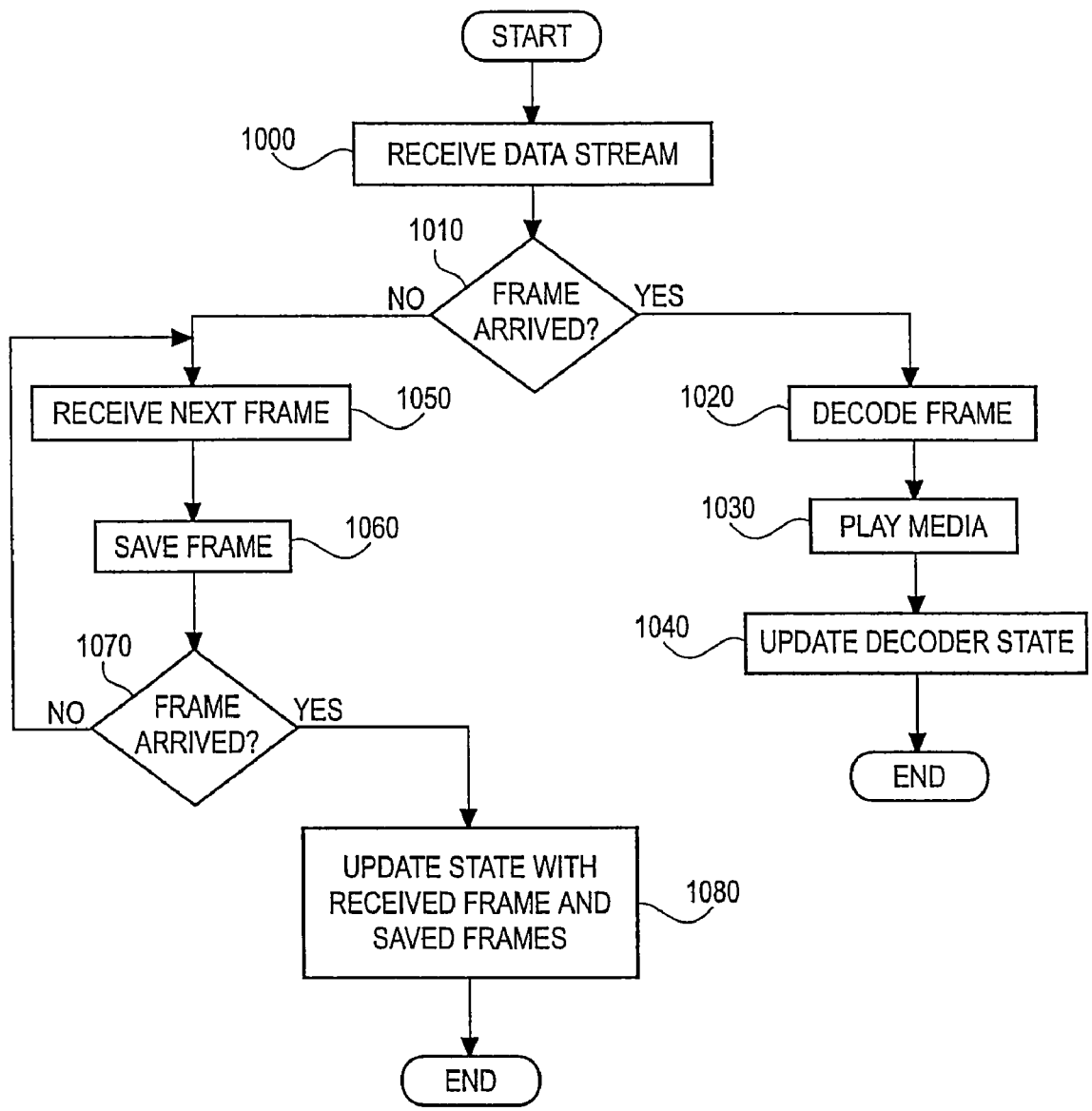

LATE FRAME RECOVERY METHOD

CROSS-REFERENCE TO RELATED APPLICATIONS

The present application is a continuation of U.S. patent application Ser. No. 11/674,442, filed Feb. 13, 2007 (now U.S. Pat. No. 7,460,479), which is a continuation of U.S. patent application Ser. No. 10/082,749, filed Feb. 25, 2002 (now U.S. Pat. No. 7,177,278), which is a continuation-in-part of U.S. patent application Ser. No. 09/522,185, filed Mar. 9, 2000 (now U.S. Pat. No. 7,423,983), which is a continuation-in-part of application Ser. No. 09/493,458, filed Jan. 28, 2000 (now U.S. Pat. No. 6,549,587), which is a continuation-in-part of application Ser. No. 09/454,219, filed Dec. 9, 1999 (now U.S. Pat. No. 6,882,711), priority of each application which is hereby claimed under 35 U.S.C. §120. All these applications are expressly incorporated herein by reference as though set forth in full.

FIELD OF THE INVENTION

The present invention relates generally to telecommunications systems, and more particularly, to a system for interfacing telephony devices with packet-based networks.

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, an integrated system for interfacing various telephony devices over packet-based networks has been difficult due to the different modulation schemes of the telephony devices. Accordingly, it would be advantageous to have an efficient and robust integrated system for the exchange of voice, fax data and modem data between telephony devices and packet-based networks.

Lost-frame recovery mechanisms are known in the art. When a transmitted data element, such as a frame of audio data, does not arrive at its destination by a predetermined playout deadline, lost-frame recovery estimates the characteristics, such as pitch and spectral information, of an audio sample corresponding to the non-arriving frame. Lost-frame recovery produces synthesized digital audio samples corresponding to the estimated non-arriving frame. The estimated audio samples are sent to a decoder state machine, which updates and stores a state of a decoder. The decoder state is used to assist in determining the characteristics of digital audio samples to be played out based on the characteristics of buffered samples that have been previously released to be played out.

In the prior art, if a frame whose characteristics have been estimated as a result of the frame not arriving by the playout deadline is subsequently received, that late frame is discarded, as the contents of the frame have already been estimated and synthesized audio samples have already been output. This results in an estimation error in the decoder state arising from the estimation of the late frame. This error propagates through subsequent states of the decoder state machine.

SUMMARY OF THE INVENTION

One aspect of the present invention is directed to a method of managing a communication system. Pursuant to the method, a transmitted encoded media data stream is received. The encoded media data stream comprises a plurality of data elements, each data element representing a portion of a transmitted media session. If a data element arrives prior to, or at, a predetermined playout deadline, the data element is decoded, the media represented by the decoded data element is played, and the data element is provided to a decoder state machine to update a decoder state. If a data element arrives after the predetermined playout deadline, the data element is provided to the decoder state machine to update the decoder state. Subsequent to the late frame arriving, the decoder state is now the same as the state assuming the frame was not late.

Another aspect of the present invention is directed to another method of managing a communication system. Pursuant to this method, a transmitted encoded media data stream is received. The encoded media data steam comprises a plurality of data elements, each data element representing a portion of a transmitted media session. If a specified data element arrives prior to, or at, a predetermined playout deadline, the data element is decoded, the media represented by the decoded data element is played, and the data element is provided to a decoder state machine to update a decoder state. If the specified data element fails to arrive by the playout deadline, a subsequently received data element is saved in memory. Then, if the specified data element arrives after the predetermined playout deadline, the specified data element and the saved, subsequently received, data element are provided to the decoder state machine to update the decoder state.

Yet another aspect of the present invention is directed to a communication system for processing a transmitted encoded media data stream comprising a plurality of data elements, each data element representing a portion of a transmitted media session. The communication system includes a jitter buffer, a decoder, a decoder state machine and an output element. The jitter buffer receives the data stream and stores each data element until a playout deadline for the data element is reached. When the playout deadline is reached, the data element is provided to the decoder and to the decoder state machine. If the jitter buffer receives a data element after the playout deadline, the late data element is provided to the decoder state machine. The decoder decodes media data elements provided by the jitter buffer. The decoder state machine maintains and updates a decoder state based on data elements provided by the jitter buffer. The output element receives decoded data elements from the decoder and plays the media represented by the decoded data elements.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 1A is a block diagram of a packet-based infrastructure providing a communication medium with a number of telephony devices in accordance with a preferred embodiment of the present invention.

FIG. 8 is a flow chart representing a method of processing communication signals according to an illustrative embodiment of the present invention.

DETAILED DESCRIPTION

An Embodiment of a Signal Processing System

In one embodiment of the present invention, a signal processing system is employed to interface telephony devices with packet-based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described embodiment of the signal processing system can be implemented with a variety of technologies including, by way of example, embedded communications software that enables transmission of information, including voice, fax and modem data over packet-based networks. The embedded communications software is preferably run on programmable digital signal processors (DSPs) and is used in gateways, cable modems, remote access servers, PBXs, and other packet-based network appliances.

Figure 1:
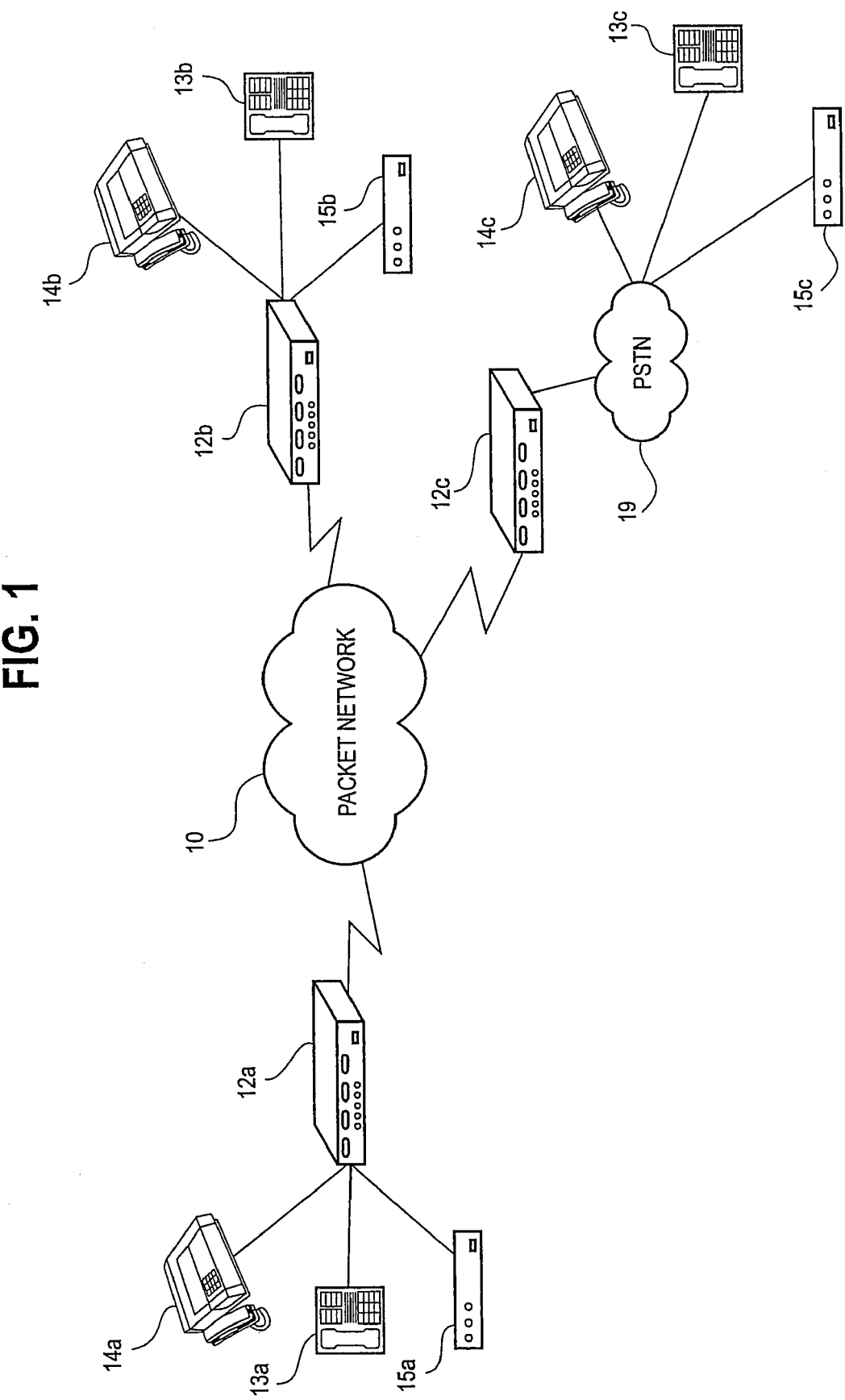
FIG. 1 is a block diagram of a packet-based infrastructure providing a communication medium with a number of telephony devices in accordance with a preferred embodiment of the present invention.

An exemplary topology is shown in FIG. 1 with a packet-based network 10 providing a communication medium between various telephony devices. Each network gateway 12a, 12b, 12c includes a signal processing system which provides an interface between the packet-based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. Each network gateway 12a, 12b, 12c could support a variety of different telephony arrangements. By way of example, each network gateway might support any number telephony devices and/or circuit-switched/packet-based networks including, among others, analog telephones, ethernet phones, fax machines, data modems, PSTN lines (Public Switching Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet-based system.

Another exemplary topology is shown in FIG. 1A. The topology of FIG. 1A is similar to that of FIG. 1 but includes a second packet-based network 16 that is connected to packet-based network 10 and to telephony devices 13b, 14b and 15b via network gateway 12b. The signal processing system of network gateway 12b provides an interface between packet-based network 10 and packet-based network 16 in addition to an interface between packet-based networks 10, 16 and telephony devices 13b, 14b and 15b. Network gateway 12d includes a signal processing system which provides an interface between packet-based network 16 and fax machine 14d, telephone 13d, and modem 15d.

Figure 2:
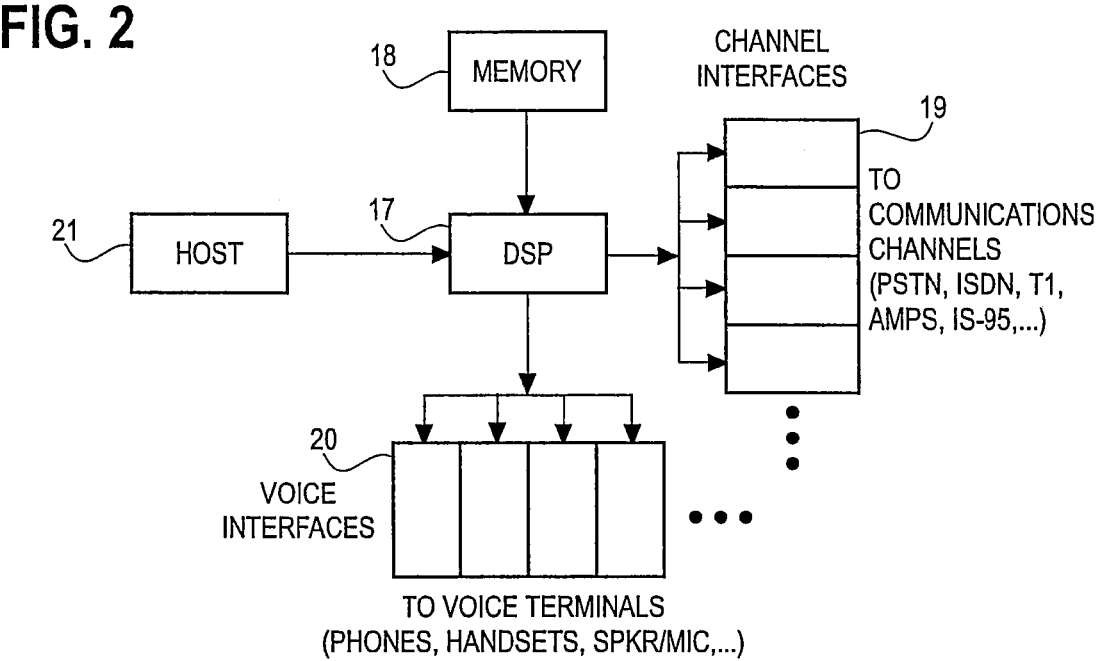
FIG. 2 is a block diagram of a signal processing system implemented with a programmable digital signal processor (DSP) software architecture in accordance with a preferred embodiment of the present invention.

The exemplary signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet-based network. The telephony interfaces 23 can be connected to a circuit-switched network interface such as a PSTN system, or directly to any telephony device. The programmable DSP is effectively hidden within the embedded communications software layer. The software layer binds all core DSP algorithms together, interfaces the DSP hardware to the host, and provides low level services such as the allocation of resources to allow higher level software programs to run.

Figure 3:
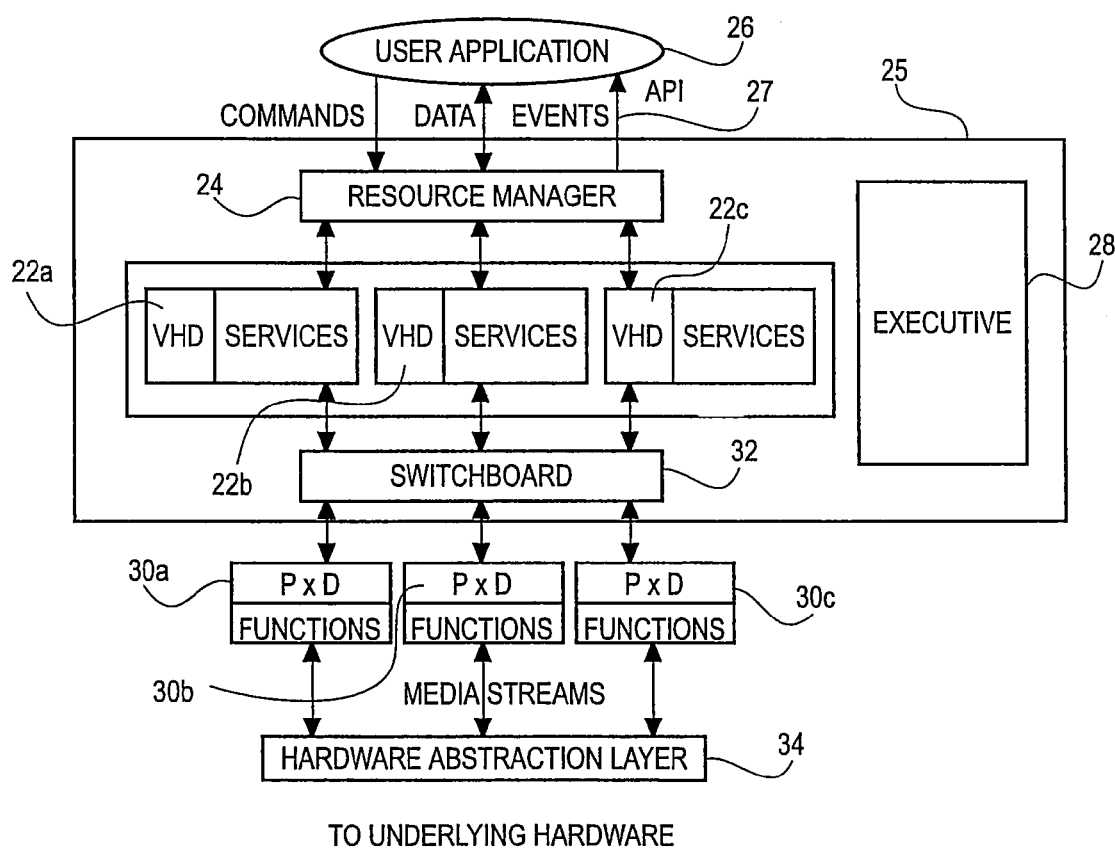
FIG. 3 is a block diagram of the software architecture operating on the DSP platform of FIG. 2 in accordance with a preferred embodiment of the present invention.

An exemplary multi-layer software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. Operating below the DSP server layer are a number of physical devices (PXD) 30a, 30b, 30c. Each PXD provides an interface between the DSP server 25 and an external telephony device (not shown) via a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDs) 22a, 22b, 22c. The VHDs are a collection of software objects that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel with a number of different telephony devices. Multiple channel capability can be achieved by adding VHDs to the DSP server 25. The resource manager 24 dynamically controls the creation and deletion of VHDs and services.

A switchboard 32 in the DSP server 25 dynamically interconnects the PXDs 30a, 30b, 30c with the VHDs 22a, 22b, 22c. Each PXD 30a, 30b, 30c is a collection of software objects which provide signal conditioning for one external telephony device. For example, a PXD may provide volume and gain control for signals from a telephony device prior to communication with the switchboard 32. Multiple telephony functionalities can be supported on a single channel by connecting multiple PXDs, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 interfaces directly with the underlying DSP 17 hardware (see FIG. 2) and exchanges telephony signals between the external telephony devices and the PXDs. The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

The exemplary software architecture described above can be integrated into numerous telecommunications products. In an exemplary embodiment, the software architecture is designed to support telephony signals between telephony devices (and/or circuit-switched networks) and packet-based networks. A network VHD (NetVHD) is used to provide a single channel of operation and provide the signal processing services for transparently managing voice, fax, and modem data across a variety of packet-based networks. More particularly, the NetVHD encodes and packetizes DTMF, voice, fax, and modem data received from various telephony devices and/or circuit-switched networks and transmits the packets to the user application layer. In addition, the NetVHD disassembles DTMF, voice, fax, and modem data from the user application layer, decodes the packets into signals, and transmits the signals to the circuit-switched network or device.

Figure 4:
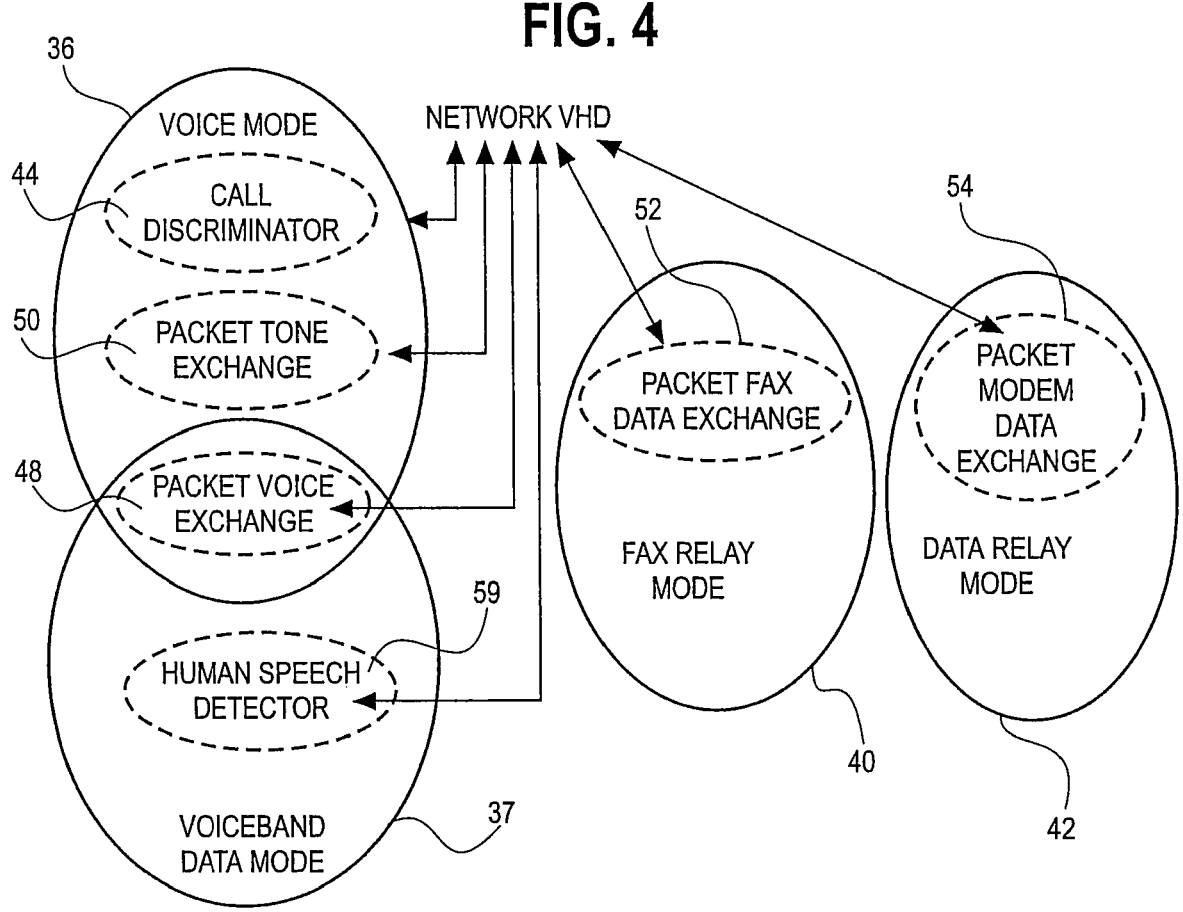
FIG. 4 is a state machine diagram of the operational modes of a virtual device driver for packet-based network applications in accordance with a preferred embodiment of the present invention.

An exemplary embodiment of the NetVHD operating in the described software architecture is shown in FIG. 4. The NetVHD includes four operational modes, namely voice mode 36, voiceband data mode 37, fax relay mode 40, and data relay mode 42. In each operational mode, the resource manager invokes various services. For example, in the voice mode 36, the resource manager invokes call discrimination 44, packet voice exchange 48, and packet tone exchange 50. The packet voice exchange 48 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (December/1990)-40, 32, 24, 16 kbit/s Adaptive Differential Pulse Code Modulation (ADPCM)), G.729A 8 kbps (Annex A (November/1996) to ITU Recommendation G.729—Coding of speech at 8 kbit/s using conjugate structure algebraic-code-excited linear-prediction (CS-ACELP) B Annex A: Reduced complexity 8 kbit/s CS-ACELP speech codec), and G.723 5.3/6.3 kbps (ITU Recommendation G.723.1 (March/1996)—Dual rate coder for multimedia communications transmitting at 5.3 and 6.3 kbit/s). The contents of each of the foregoing ITU Recommendations being incorporated herein by reference as if set forth in full.

The packet voice exchange 48 is common to both the voice mode 36 and the voiceband data mode 37. In the voiceband data mode 37, the resource manager invokes the packet voice exchange 48 for exchanging transparently data without modification (other than packetization) between the telephony device (or circuit-switched network) and the packet-based network. This is typically used for the exchange of fax and modem data when bandwidth concerns are minimal as an alternative to demodulation and remodulation. During the voiceband data mode 37, the human speech detector service 59 is also invoked by the resource manager. The human speech detector 59 monitors the signal from the near end telephony device for speech. In the event that speech is detected by the human speech detector 59, an event is forwarded to the resource manager which, in turn, causes the resource manager to terminate the human speech detector service 59 and invoke the appropriate services for the voice mode 36 (i.e., the call discriminator, the packet tone exchange, and the packet voice exchange).

In the fax relay mode 40, the resource manager invokes a fax exchange 52 service. The packet fax exchange 52 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet data exchange 54 service in the data relay mode 42. The packet data exchange 52 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet-based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

The Voice Mode

Figure 5:
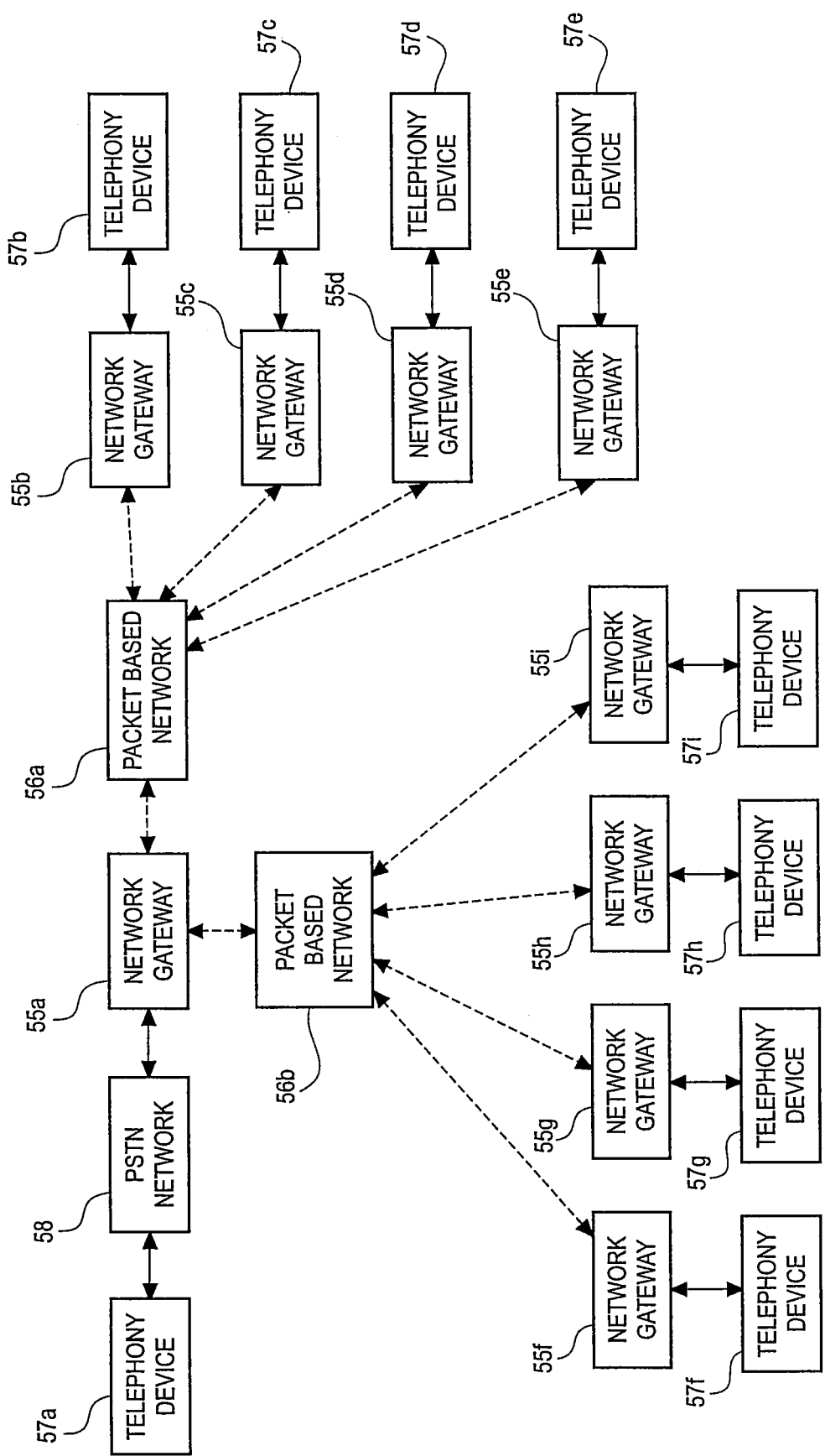
FIG. 5 is a block diagram of several signal processing systems in the voice mode for interfacing between a switched circuit network and a packet-based network in accordance with a preferred embodiment of the present invention.

Voice mode provides signal processing of voice signals. As shown in the exemplary embodiment depicted in FIG. 5, voice mode enables the transmission of voice over a packet-based system such as Voice over IP (VoIP, H.323), Voice over Frame Relay (VOFR, FRF-11), Voice Telephony over ATM (VTOA), or any other proprietary network. The voice mode should also permit voice to be carried over traditional media such as time division multiplex (TDM) networks and voice storage and playback systems. Network gateway 55a supports the exchange of voice between a traditional circuit-switched network 58 and packet-based networks 56(a) and 56(b). Network gateways 55b, 55c, 55d, 55e support the exchange of voice between packet-based network 56a and a number of telephony devices 57b, 57c, 57d, 57e. In addition, network gateways 55f, 55g, 55h, 55i support the exchange of voice between packet-based network 56b and telephony devices 57f, 57g, 57h, 57i. Telephony devices 57a, 57b, 57c, 57d, 57e, 55f, 55g, 55h, 55i can be any type of telephony device including telephones, facsimile machines and modems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 6:
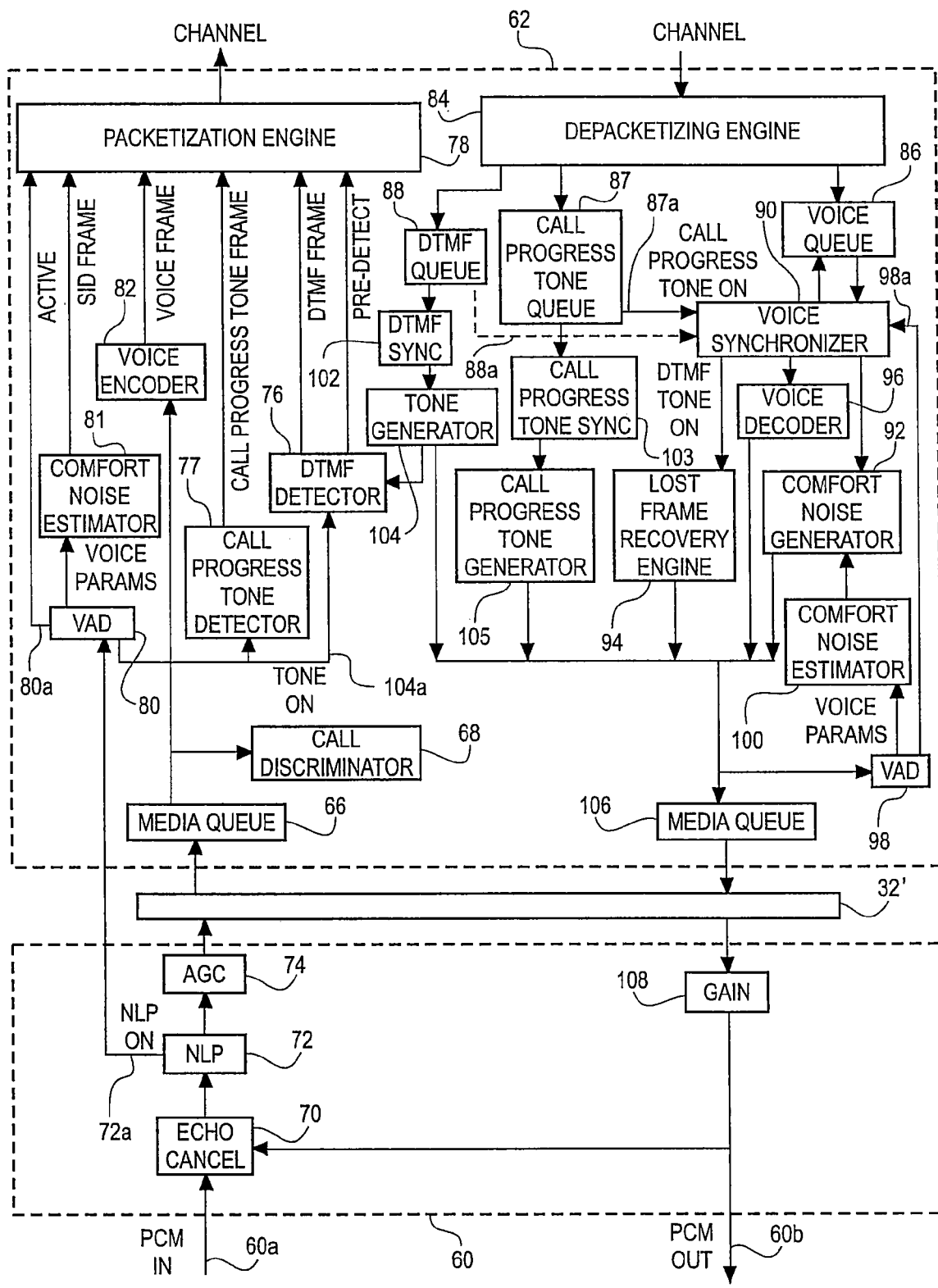
FIG. 6 is a system block diagram of a signal processing system operating in a voice mode in accordance with a preferred embodiment of the present invention.

The services invoked by the network VHD in the voice mode and the associated PXD is shown schematically in FIG. 6. In the described exemplary embodiment, the PXD 60 provides two way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far end echoes that might otherwise be transmitted back to the far end user. As the name implies, echoes in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 70 is used to remove echoes from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which in the absence of near end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. As described above with reference to FIG. 4, if either tone or HDLC flags are detected, the voice mode services are terminated and the appropriate service for fax or modem operation is initiated. In the absence of a 2100

Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72*a* passed from the NLP 72 to the VAD 80.

The voice encoder 82, operating under the packet voice exchange, can be a straight 16 bit PCM encoder or any voice encoder which supports one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80*a* to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 76 determines whether or not there is a DTMF signal present at the near end. The DTMF detector 76 also provides a pre-detection flag 76*a* which indicates whether or not it is likely that the digital voice sample might be a portion of a DTMF signal. If so, the pre-detection flag 76*a* is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76*a* is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a depacketizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The depacketizing engine 84 identifies the type of packets received from the host (i.e., voice packet, DTMF packet, call progress tone packet, SID packet), transforms them into frames which are protocol independent. The depacketizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 92 from the voice parameters in the SID packets buffered in the voice queue 86. However, for some protocols, namely, FRF-11, the SID packets are optional, and other far end users may not support SID packets at all. In these systems, the voice synchronizer 90 must continue to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are depacketized by the depacketizing engine 84. Call progress tone frames at the output of the depacketizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87a passed between the call progress tone queue 87 and the voice synchronizer 90.

The call progress tone generator 105 converts the call progress tone signals into a call progress tone suitable for a standard digital or analog telephone. The call progress tone generator 10s overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

The outgoing PCM signal in the media queue 106 is coupled to the PXD 60 via the switchboard 32'. The outgoing PCM signal is coupled to an amplifier 108 before being outputted on the PCM output line 60b.

1. Voice Encoder/Voice Decoder

The purpose of voice compression algorithms is to represent voice with highest efficiency (i.e., highest quality of the reconstructed signal using the least number of bits). Voice can be characterized by a set of slowly varying parameters that can later be used to reconstruct an approximately matching voice signal. Characteristics of voice perception allow for lossy compression without perceptible loss of quality.

Voice compression begins with an analog-to-digital converter that samples the analog voice at an appropriate rate (usually 8,000 samples per second for telephone bandwidth voice) and then represents the amplitude of each sample as a binary code that is transmitted in a serial fashion. In communications systems, this coding scheme is called pulse code modulation (PCM).

When using a uniform (linear) quantizer in which there is uniform separation between amplitude levels. This voice compression algorithm is referred to as "linear," or "linear PCM." Linear PCM is the simplest and most natural method of quantization. The drawback is that the signal-to-noise ratio (SNR) varies with the amplitude of the voice sample. This can be substantially avoided by using non-uniform quantization known as companded PCM.

In companded PCM, the voice sample is compressed to logarithmic scale before transmission, and expanded upon reception. This conversion to logarithmic scale ensures that low-amplitude voice signals are quantized with a minimum loss of fidelity, and the SNR is more uniform across all amplitudes of the voice sample. The process of compressing and expanding the signal is known as "companding" (COMpressing and exPANDing). There exists a worldwide standard for companded PCM defined by the CCITT (the International Telegraph and Telephone Consultative Committee).

The CCITT is a Geneva-based division of the International Telecommunications Union (ITU), a New York-based United Nations organization. The CCITT is now formally known as the ITU-T, the telecommunications sector of the ITU, but the term CCITT is still widely used. Among the tasks of the CCITT is the study of technical and operating issues and releasing recommendations on them with a view to standardizing telecommunications on a worldwide basis. A subset of these standards is the G-Series Recommendations, which deal with the subject of transmission systems and media, and digital systems and networks. Since 1972, there have been a number of G-Series Recommendations on speech coding, the earliest being Recommendation G.711. G.711 has the best voice quality of the compression algorithms but the highest bit rate requirement.

The "first" voice compression algorithm standard defined by the ITU-T for digital telephony was companded PCM as defined in Recommendation G.711. This Recommendation constitutes the principal reference as far as transmission systems are concerned. The basic principle of the G.711 companded PCM algorithm is to compress voice using 8 bits per sample, the voice being sampled at 8 kHz, keeping the telephony bandwidth of 300-3400 Hz. With this combination, each voice channel requires 64 kilobits per second.

Note that when the term PCM is used in digital telephony, it usually refers to the companded PCM specified in Recommendation G.711, and not linear PCM, since most transmission systems transfer data in the companded PCM format. Companded PCM is currently the most common digitization scheme used in telephone networks. Today, nearly every telephone call in North America is encoded at some point along the way using G.711 companded PCM.

ITU Recommendation G.726 specifies a multiple-rate ADPCM compression technique for converting 64 kilobit per second companded PCM channels (specified by Recommendation G.711) to and from a 40, 32, 24, or 16 kilobit per second channel. The bit rates of 40, 32, 24, and 16 kilobits per second correspond to 5, 4, 3, and 2 bits per voice sample.

ADPCM is a combination of two methods: Adaptive Pulse Code Modulation (APCM), and Differential Pulse Code Modulation (DPCM). Adaptive Pulse Code Modulation can be used in both uniform and non-uniform quantizer systems. It adjusts the step size of the quantizer as the voice samples change, so that variations in amplitude of the voice samples, as well as transitions between voiced and unvoiced segments, can be accommodated. In DPCM systems, the main idea is to quantize the difference between contiguous voice samples. The difference is calculated by subtracting the current voice sample from a signal estimate predicted from previous voice sample. This involves maintaining an adaptive predictor (which is linear, since it only uses first-order functions of past values). The variance of the difference signal results in more efficient quantization (the signal can be compressed coded with fewer bits).

The G.726 algorithm reduces the bit rate required to transmit intelligible voice, allowing for more channels. The bit rates of 40, 32, 24, and 16 kilobits per second correspond to compression ratios of 1.6:1, 2:1, 2.67:1, and 4:1 with respect to 64 kilobits per second companded PCM. Both G.711 and G.726 are waveform encoders; they can be used to reduce the bit rate required to transfer any waveform, like voice, and low bit-rate modem signals, while maintaining an acceptable level of quality.

There exists another class of voice encoders, which model the excitation of the vocal tract to reconstruct a waveform that appears very similar when heard by the human ear, although it may be quite different from the original voice signal. These voice encoders, called vocoders, offer greater voice compression while maintaining good voice quality, at the penalty of higher computational complexity and increased delay.

For the reduction in bit rate over G.711, one pays for an increase in computational complexity. Among voice encoders, the G.726 ADPCM algorithm ranks low to medium on a relative scale of complexity, with companded PCM being of the lowest complexity and code-excited linear prediction (CELP) vocoder algorithms being of the highest.

The G.726 ADPCM algorithm is a sample-based encoder like the G.711 algorithm, therefore, the algorithmic delay is limited to one sample interval. The CELP algorithms operate on blocks of samples (0.625 ms to 30 ms for the ITU coder), so the delay they incur is much greater.

The quality of G.726 is best for the two highest bit rates, although it is not as good as that achieved using companded PCM. The quality at 16 kilobits per second is quite poor (a noticeable amount of noise is introduced), and should normally be used only for short periods when it is necessary to conserve network bandwidth (overload situations).

The G.726 interface specifies as input to the G.726 encoder (and output to the G.726 decoder) an 8-bit companded PCM sample according to Recommendation G.711. So strictly speaking, the G.726 algorithm is a transcoder, taking log-PCM and converting it to ADPCM, and vice-versa. Upon input of a companded PCM sample, the G.726 encoder converts it to a 14-bit linear PCM representation for intermediate processing. Similarly, the decoder converts an intermediate 14-bit linear PCM value into an 8-bit companded PCM sample before it is output. An extension of the G.726 algorithm was carried out in 1994 to include, as an option, 14-bit linear PCM input signals and output signals. The specification for such a linear interface is given in Annex A of Recommendation G.726.

The interface specified by G.726 Annex A bypasses the input and output companded PCM conversions. The effect of removing the companded PCM encoding and decoding is to decrease the coding degradation introduced by the compression and expansion of the linear PCM samples.

The algorithm implemented in the described exemplary embodiment can be the version specified in G.726 Annex A, commonly referred to as G.726A, or any other voice compression algorithm. Among these voice compression algorithms are those standardized for telephony by the ITU-T. Several of these algorithms operate at a sampling rate of 8000 Hz. with different bit rates for transmitting the encoded voice. By way of example, Recommendations G.729 (1996) and G.723.1 (1996) define code excited linear prediction (CELP) algorithms that provide even lower bit rates than G.711 and G.726. G.729 operates at 8 kbps and G.723.1 operates at either 5.3 kbps or 6.3 kbps.

In an exemplary embodiment, the voice encoder and the voice decoder support one or more voice compression algorithms, including but not limited to, 16 bit PCM (non-standard, and only used for diagnostic purposes); ITU-T standard G.711 at 64 kb/s; G.723.1 at 5.3 kb/s (ACELP) and 6.3 kb/s (MP-MLQ); ITU-T standard G.726 (ADPCM) at 16, 24, 32, and 40 kb/s; ITU-T standard G.727 (Embedded ADPCM) at 16, 24, 32, and 40 kb/s; ITU-T standard G.728 (LD-CELP) at 16 kb/s; and ITU-T standard G.729 Annex A (CS-ACELP) at 8 kb/s.

The packetization interval for 16 bit PCM, G.711, G.726, G.727 and G.728 should be a multiple of 5 msec in accordance with industry standards. The packetization interval is the time duration of the digital voice samples that are encapsulated into a single voice packet. The voice encoder (decoder) interval is the time duration in which the voice encoder (decoder) is enabled. The packetization interval should be an integer multiple of the voice encoder (decoder) interval (a frame of digital voice samples). By way of example, G.729 encodes frames containing 80 digital voice samples at 8 kHz which is equivalent to a voice encoder (decoder) interval of 10 msec. If two subsequent encoded frames of digital voice sample are collected and transmitted in a single packet, the packetization interval in this case would be 20 msec.

G.711, G.726, and G.727 encodes digital voice samples on a sample by sample basis. Hence, the minimum voice encoder (decoder) interval is 0.125 msec. This is somewhat of a short voice encoder (decoder) interval, especially if the packetization interval is a multiple of 5 msec. Therefore, a single voice packet will contain 40 frames of digital voice samples. G.728 encodes frames containing 5 digital voice samples (or 0.625 msec). A packetization interval of 5 msec (40 samples) can be supported by 8 frames of digital voice samples. G.723.1 compresses frames containing 240 digital voice samples. The voice encoder (decoder) interval is 30 msec, and the packetization interval should be a multiple of 30 msec.

Packetization intervals which are not multiples of the voice encoder (or decoder) interval can be supported by a change to the packetization engine or the depacketization engine. This may be acceptable for a voice encoder (or decoder) such as G.711 or 16 bit PCM.

The G.728 standard may be desirable for some applications. G.728 is used fairly extensively in proprietary voice conferencing situations and it is a good trade-off between bandwidth and quality at a rate of 16 kb/s. Its quality is superior to that of G.729 under many conditions, and it has a much lower rate than G.726 or G.727. However, G.728 is MIPS intensive.

Differentiation of various voice encoders (or decoders) may come at a reduced complexity. By way of example, both G.723.1 and G.729 could be modified to reduce complexity, enhance performance, or reduce possible IPR conflicts. Performance may be enhanced by using the voice encoder (or decoder) as an embedded coder. For example, the "core" voice encoder (or decoder) could be G.723.1 operating at 5.3 kb/s with "enhancement" information added to improve the voice quality. The enhancement information may be discarded at the source or at any point in the network, with the quality reverting to that of the "core" voice encoder (or decoder). Embedded coders may be readily implemented since they are based on a given core. Embedded coders are rate scalable, and are well suited for packet based networks. If a higher quality 16 kb/s voice encoder (or decoder) is required, one could use G.723.1 or G.729 Annex A at the core, with an extension to scale the rate up to 16 kb/s (or whatever rate was desired).

The configurable parameters for each voice encoder or decoder include the rate at which it operates (if applicable), which companding scheme to use, the packetization interval, and the core rate if the voice encoder (or decoder) is an embedded coder. For G.727, the configuration is in terms of bits/sample. For example EADPCM(5,2) (Embedded ADPCM, G.727) has a bit rate of 40 kb/s (5 bits/sample) with the core information having a rate of 16 kb/s (2 bits/sample).

The decoder 96 includes a decoder state machine that stores and updates a state of the decoder. The decoder state is used to assist in determining the characteristics of digital audio samples that are to be output to the media queue 106 based on the characteristics of buffered samples that have been previously released to the media queue 106. The decoder state can be used to determine the characteristics of an audio sample that is decoded from a packet provided to the decoder 96 by the voice synchronizer 90. The decoder state can also be used to determine the characteristics of an audio sample that is estimated by the lost frame recovery engine 94 for a packet that is not received by a predetermined playout deadline. The decoder state machine uses the buffered audio samples to recursively quantize information regarding a particular audio sample. Information that the state machine recursively quantizes can include the gain, pitch, excitation and spectral information of the audio sample.

2. Packetization Engine

In an exemplary embodiment, the packetization engine groups voice frames from the voice encoder, and with information from the VAD, creates voice packets in a format appropriate for the packet based network. The two primary voice packet formats are generic voice packets and SID packets. The format of each voice packet is a function of the voice encoder used, the selected packetization interval, and the protocol.

The packetization engine could be implemented in the host. However, this may unnecessarily burden the host with configuration and protocol details. If a complete self-contained signal processing system is desired, then the packetization engine can be operated in the network VHD. Furthermore, there is significant interaction between the voice encoder, the VAD, and the packetization engine, which further promotes the desirability of operating the packetization engine in the network VHD.

The packetization engine may generate the entire voice packet or just the voice portion of the voice packet. In particular, a fully packetized system with all the protocol headers may be implemented, or alternatively, only the voice portion of the packet will be delivered to the host. By way of example, for VoIP, it is reasonable to create the real-time transport protocol (RTP) encapsulated packet with the packetization engine, but have the remaining transmission control protocol/Internet protocol (TCP/IP) stack residing in the host. In the described exemplary embodiment, the voice packetization functions reside in the packetization engine. The voice packet should be formatted according to the particular standard, although not all headers or all components of the header need to be constructed.

3. Voice Depacketizing Engine/Voice Queue

In an exemplary embodiment, voice de-packetization and queuing is a real time task which queues the voice packets with a time stamp indicating the arrival time. The voice queue should accurately identify packet arrival time within one msec resolution. Resolution should preferably not be less than the encoding interval of the far end voice encoder. The depacketizing engine should have the capability to process voice packets that arrive out of order, and to dynamically switch between voice encoding methods (i.e. between, for example, G.723.1 and G.711). Voice packets should be queued such that it is easy to identify the voice frame to be released, and easy to determine when voice packets have been lost or discarded en route.

The voice queue may require significant memory to queue the voice packets. By way of example, if G.711 is used, and the worst case delay variation is 250 msec, the voice queue should be capable of storing up to 500 msec of voice frames. At a data rate of 64 kb/s this translates into 4000 bytes or, or 2K (16 bit) words of storage. Similarly, for 16 bit PCM, 500 msec of voice frames require 4K words. Limiting the amount of memory required may limit the worst case delay variation of 16 bit PCM and possibly G.711 This, however, depends on how the voice frames are queued, and whether dynamic memory allocation is used to allocate the memory for the voice frames. Thus, it is preferable to optimize the memory allocation of the voice queue.

The voice queue transforms the voice packets into frames of digital voice samples. If the voice packets are at the fundamental encoding interval of the voice frames, then the delay jitter problem is simplified. In an exemplary embodiment, a double voice queue is used. The double voice queue includes a secondary queue which time stamps and temporarily holds the voice packets, and a primary queue which holds the voice packets, time stamps, and sequence numbers. The voice packets in the secondary queue are disassembled before transmission to the primary queue. The secondary queue stores packets in a format specific to the particular protocol, whereas the primary queue stores the packets in a format which is largely independent of the particular protocol.

In practice, it is often the case that sequence numbers are included with the voice packets, but not the SID packets, or a sequence number on a SID packet is identical to the sequence number of a previously received voice packet. Similarly, SID packets may or may not contain useful information. For these reasons, it may be useful to have a separate queue for received SID packets.

The depacketizing engine is preferably configured to support VoIP, VTOA, VoFR and other proprietary protocols. The voice queue should be memory efficient, while providing the ability to handle dynamically switched voice encoders (at the far end), allow efficient reordering of voice packets (used for VoIP) and properly identify lost packets.

4. Voice Synchronization

In an exemplary embodiment, the voice synchronizer analyzes the contents of the voice queue and determines when to release voice frames to the voice decoder, when to play comfort noise, when to perform frame repeats (to cope with lost voice packets or to extend the depth of the voice queue), and when to perform frame deletes (in order to decrease the size of the voice queue). The voice synchronizer manages the asynchronous arrival of voice packets. For those embodiments which are not memory limited, a voice queue with sufficient fixed memory to store the largest possible delay variation is used to process voice packets which arrive asynchronously. Such an embodiment includes sequence numbers to identify the relative timings of the voice packets. The voice synchronizer should ensure that the voice frames from the voice queue can be reconstructed into high quality voice, while minimizing the end-to-end delay. These are competing objectives so the voice synchronizer should be configured to provide system trade-off between voice quality and delay.

Preferably, the voice synchronizer is adaptive rather than fixed based upon the worst case delay variation. This is especially true in cases such as VoIP where the worst case delay variation can be on the order of a few hundreds of milliseconds. By way of example, consider a VoIP system with a fixed voice synchronizer based on a worst case delay variation of 300 msec. If the actual delay variation is 280 msec, the signal processing system operates as expected. However, if the actual delay variation is 20 msec, then the end-to-end delay is at least 280 msec greater than required. In this case the voice quality should be acceptable, but the delay would be undesirable. On the other hand, if the delay variation is 330 msec then an underflow condition could exist degrading the voice quality of the signal processing system.

The voice synchronizer performs four primary tasks. First, the voice synchronizer determines when to release the first voice frame of a talk spurt or conversation from the far end. Subsequent to the release of the first voice frame, the remaining voice frames are released in an isochronous manner. In an exemplary embodiment, the first voice frame is held for a period of time that is equal or less than the estimated worst case jitter.

Second, the voice synchronizer estimates how long the first voice frame of the talk spurt should be held. If the voice synchronizer underestimates the required "target holding time," jitter buffer underflow will likely result. However, jitter buffer underflow could also occur at the end of a talk spurt, or during a short silence interval. Therefore, SID packets and sequence numbers could be used to identify what caused the jitter buffer underflow, and whether the target holding time should be increased. If the voice synchronizer overestimates the required "target holding time," all voice frames will be held too long, potentially causing jitter buffer overflow. In response to jitter buffer overflow or high hold times, the target holding time should be decreased. In the described exemplary embodiment, the voice synchronizer increases the target holding time rapidly for jitter buffer underflow due to excessive jitter, but decreases the target holding time slowly when holding times are excessive. This approach allows rapid adjustments for voice quality problems while being more forgiving for excess delays of voice packets.

Thirdly, the voice synchronizer provides a methodology by which frame repeats and frame deletes are performed within the voice decoder. Estimated jitter is only utilized to determine when to release the first frame of a talk spurt. Therefore, changes in the delay variation during the transmission of a long talk spurt must be independently monitored. On buffer underflow (an indication that delay variation is increasing), the voice synchronizer instructs the lost frame recovery engine to issue voice frames repeats. In particular, the frame repeat command instructs the lost frame recovery engine (possibly within the voice decoder) to utilize the parameters from the previous voice frame to estimate the parameters of the current voice frame. Thus, if frames 1, 2 and 3 are normally transmitted and frame 3 arrives late, frame repeat is issued after frame number 2, and if frame number 3 arrives during this period, it is then transmitted. The sequence would be frames 1,2, a frame repeat of frame 2 and then frame 3. Performing frame repeats causes the delay to increase, which increasing the size of the jitter buffer to cope with increasing delay characteristics during long talk spurts. Frame repeats are also issued to replace voice frames that are lost en route.

Conversely, if the holding time is too large due to decreasing delay variation, the speed at which voice frames are released should be increased. Typically, the target holding time can be adjusted, which automatically compresses the following silent interval. However, during a long talk spurt, it may be necessary to decrease the holding time more rapidly to minimize the excessive end to end delay. This can be accomplished by passing two voice frames to the voice decoder in one decoding interval but only one of the voice frames is transferred to the media queue.

The voice synchronizer must also function under conditions of severe buffer overflow, where the physical memory of the signal processing system is insufficient due to excessive delay variation. When subjected to severe buffer overflow, the voice synchronizer could simply discard voice frames.

The voice synchronizer should operate with or without sequence numbers, time stamps, and SID packets. The voice synchronizer should also operate with voice packets arriving out of order and lost voice packets. In addition, the voice synchronizer preferably provides a variety of configuration parameters which can be specified by the host for optimum performance, including minimum and maximum target holding time. With these two parameters, it is possible to use a fully adaptive jitter buffer by setting the minimum target holding time to zero msec and the maximum target holding time to 500 msec (or the limit imposed due to memory constraints). Although the preferred voice synchronizer is fully adaptive and able to adapt to varying network conditions, those skilled in the art will appreciate that the voice synchronizer can also be maintained at a fixed holding time by setting the minimum and maximum holding times to be equal.

5. Lost Packet Recovery/Frame Deletion

In applications where voice is transmitted through a packet based network there are instances where not all of the packets reach the intended destination. The voice packets may either arrive too late to be sequenced properly or may be lost entirely. These losses may be caused by network congestion, delays in processing or a shortage of processing cycles. The packet loss can make the voice difficult to understand or annoying to listen to.

Packet recovery refers to methods used to hide the distortions caused by the loss of voice packets. In the described exemplary embodiment, a lost packet recovery engine is implemented whereby missing voice is filled with synthesized voice using the linear predictive coding model of speech. The voice is modelled using the pitch and spectral information from digital voice samples received prior to the lost packets.

The lost packet recovery engine, in accordance with an exemplary embodiment, is completely contained in the decoder system. The algorithm uses previous digital voice samples or a parametric representation thereof, to estimate the contents of lost packets when they occur. The lost packet recovery engine may be contained within the voice decoder. Packet loss concealment or lost frame recovery is defined in many ITU-T standards such as G.711, G.729, and G.723.1 and in various ETSI standards (GSM-EFR, GSM-AMR and so on).

As described above, when a frame does not arrive by a predetermined playout deadline, the lost-frame recovery engine 94 estimates the characteristics, such as pitch and spectral information, of an audio sample corresponding to the non-arriving frame. The lost-frame recovery engine produces synthesized digital audio samples corresponding to the estimated non-arriving frame. The estimated audio samples are sent to the decoder state machine, which updates and stores a state of the decoder. As is described above with respect to the voice decoder 96, the decoder state is used to assist in determining the characteristics of digital audio samples that are output to the media queue 106 based on the characteristics of buffered samples that have been previously released to the media queue 106.

In the prior art, if a frame whose characteristics have been estimated as a result of the frame not arriving by the playout deadline is subsequently received, that late frame is discarded, as the contents of the frame have already been estimated and synthesized audio samples have already been output.

According to an illustrative embodiment of the present invention, when a lost-frame event occurs, that is, when a given frame is not received by its playout deadline, the decoder saves the known state existing prior to the lost-frame condition. In an illustrative embodiment, the entire decoder state is saved, but in an alternative embodiment, only a portion of the decoder state deemed important to maintain is saved. Then if and when the late frame is received, the frame is not discarded. Instead, late frames are sent to the decoder state machine to update the decoder state. In one embodiment, the decoder state is updated by backing up to the known correct state prior to the frame-loss condition and recalculating the decoder state using the late frame instead of the estimated frame that was initially used.

Figure 7:
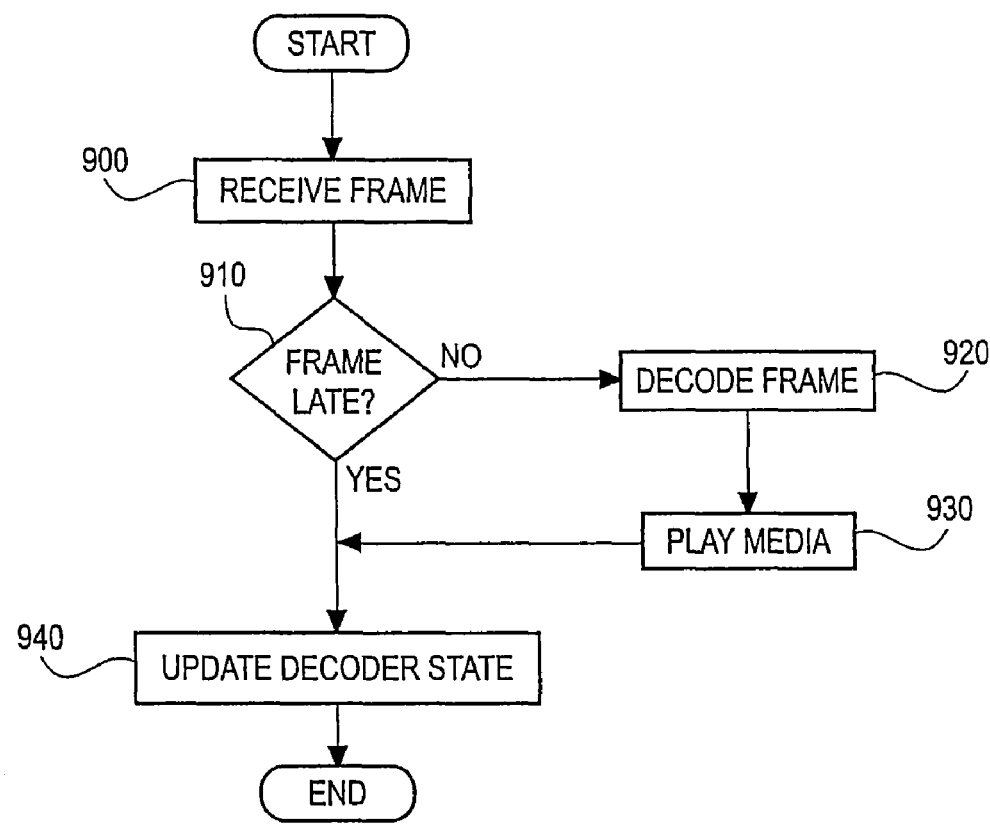
FIG. 7 is a flow chart representing a method of processing communication signals according to an illustrative embodiment of the present invention.

FIG. 7 is a flow chart representing a method of processing communication signals according to an illustrative embodiment of the present invention. At step 900, one data element, such as a frame, in a transmitted encoded media data stream is received. If a given data element arrives prior to, or at, a predetermined playout deadline 910, the data element is decoded, as shown at step 920, and the media represented by the decoded data element is played, as shown at step 930, and the data element is provided to a decoder state machine to update a decoder state, as shown at step 940. If a data element arrives after the predetermined playout deadline 910, the data element is provided to the decoder state machine to update the decoder state 940, without decoding the data element 920 and playing the associated media 930.

In a simple illustrative embodiment of the present invention, the decoder state machine is implemented as a scalar quantizer with memory. The quantizer quantizes the gain parameter G (into G') according to the rule:

$$G'(n)=Q[G(n)]=S(n-1)+d(n),$$

where S(n) is the state of the quantizer and q(n) is the quantizer output. The parameter d(n) is explicitly sent over the channel, whereas S(n−1) is generated both at the encoder and the decoder 96. In an exemplary embodiment, S(n−1)=αG' (n−1). If the initial state of the encoder and decoder 96 are equal (i.e., S(0)=0), then the state of the decoder 96 and the state of the encoder will be equal in the absence of any lost frames. However, a lost frame would tend to lead to error propagation that would eventually reduce to zero (assuming $|\alpha|<1$). For purposes of illustration, consider a session of 10 frames sent (numbered from 1 to 10) and that frame number 5 arrives late. When frame 5 is scheduled for release, the lost frame recovery engine 94 produces an estimated value of G'(5) and the decoder updates S(5) using the estimated value of G'(5). In a simple illustrative embodiment, G'(5) is set to G'(4) and S(5) is set to αG'(4). According to an exemplary embodiment of the present invention, the decoder 96 also saves S(4) and an indication that the frame 4 state was saved. When frame 5 eventually arrives (late) the frame is passed to the decoder 96. The decoder 96 compares the late indicator with the saved frame sequence number. Since the present value is one less than the current value, the decoder 96 knows it can correct the state. In an illustrative embodiment, the decoder 96 then performs the normal decode operation (G'(5)=S(4)+d(5)) and updates the state in the correct manner (S(5)=αG'(5)) without playing out the late frame. This provides the correct state for future frame decoding. This example is extendable to multiple late frames and to all decoder parameters. Also, the technique is applicable to vector quantizers (with memory) and other state-based quantizers and decoders.

In another embodiment of the present invention, when a given frame is not received, by its playout deadline, subsequently received frames that arrive before the given late frame are stored in memory. If and when the late frame is received, the decoder state is updated using the late frame together with the subsequently received frames. FIG. 8 is a flow chart representing a method of processing communication signals according to an illustrative embodiment of the present invention. At step 1000, a transmitted encoded media data stream is received. The encoded media data steam comprises a plurality of media data elements, such as frames. At step 1010, it is determined whether a specified frame has been received by the playout deadline. If the frame has been received by the playout deadline, the frame is decoded, as shown at step 1020, the media represented by the decoded frame is played, as shown at step 1030, and the frame is provided to a decoder state machine to update a decoder state, as shown at step 1040. If the specified data element fails to arrive by the playout deadline, the next frame in the sequence is received 1050. The received frame is stored in memory, as shown at step 1060. At step 1070, it is ascertained whether the specified frame has been received yet. If it has not, the next frame in the sequence is received and stored. If it has, the received specified frame and the saved frames are provided to the decoder state machine to update the decoder state. For example, if frame n arrives, and is followed by frames n+2, n+3, and finally by n+1, and n+4, the following steps are conducted (in sequence): (1) decode frame n; (2) frame n+1 is late, so save the current (or a portion thereof) decoder state and execute the frame loss recover mechanism; (3) frame n+2 is available, released, and is saved; (4) frame n+3 is available, released, and is saved; (5) frame n+1 (finally) arrives, the decoder state is reverted to that saved in step (2), the decoder state is update with the information in frames n+1 through n+3, and frame n+4 is released. The state before frame n+4 is now what it would have been if no frames had been late.

In an illustrative embodiment of the method of FIG. 8, if the specified frame is not received by the playout deadline, a limit n is placed on the number of subsequently received frames that will be saved in anticipation of the specified frame eventually arriving. When the n+1st frame beyond the playout deadline is received, the saved frames are discarded and the decoder state will not be updated if and when the specified non-arriving frame is received. In one embodiment, only the immediately subsequent frame will be saved. In that embodiment, when a second frame is received after the playout deadline of the specified non-arriving frame, the saved frame is discarded and the decoder state will not be updated if and when the specified non-arriving frame is received.

In one implementation of the method of FIG. 8, the decoder state prior to the non-arrival (and resulting frame estimation) of the specified frame is also saved. Then, if and when the specified non-arriving frame subsequently is received, the decoder state is retroactively recalculated starting with the saved "good" state, updating the state first with the late frame and then with the saved frames that arrived between the playout deadline and the eventual arrival of the late packet.

In summary, an illustrative embodiment of the present invention is directed to a communication system for processing a transmitted encoded media data stream comprising a plurality of data elements, each data element representing a portion of a transmitted media session. The communication system includes a jitter buffer 86, 90, a decoder 96, a decoder state machine and an output element 108. The jitter buffer 86, 90 receives the data stream and stores each data element until a playout deadline for the data element is reached. When the playout deadline is reached, the data element is provided to the decoder 96 and to the decoder state machine. If the jitter buffer 86, 90 receives a data element after the playout deadline, the late data element is provided to the decoder state machine. The decoder 96 decodes media data elements provided by the jitter buffer 86, 90. The decoder state machine maintains and updates a decoder state based on data elements provided by the jitter buffer 86, 90. The output element 108 receives decoded data elements from the decoder 96 and plays the media represented by the decoded data elements.

The present invention enables higher quality media, such as voice, in packet networks. Alternatively, a lower delay can be maintained while achieving the same media quality.

Although a preferred embodiment of the present invention has been described, it should not be construed to limit the scope of the appended claims. For example, the present invention is applicable to any real-time media, such as audio and video, in addition to the voice media illustratively described herein. Also, the invention is applicable to the recovery of any type of late data element, such as packets, in addition to the application to late frames described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of processing communication signals, comprising:
receiving a transmitted encoded media data stream comprising a plurality of data elements, each data element representing a portion of a transmitted media session;
if a data element arrives prior to, or at, a predetermined playout deadline, performing steps of:
decoding the data element; and
providing the data element to a decoder state machine to update a decoder state; and
if a data element arrives after the predetermined playout deadline, providing the data element to the decoder state machine to update the decoder state.

2. The method of claim 1, wherein if the data element arrives after the predetermined playout deadline, the data element is not decoded.

3. The method of claim 1, wherein the media data stream is an encoded audio data stream comprising a plurality of audio data elements, each representing a portion of a transmitted audio session.

4. The method of claim 3, wherein the media data stream is an encoded voice data stream comprising a plurality of voice data elements, each representing a portion of a transmitted voice session.

5. The method of claim 1, wherein the media data stream is an encoded video data stream comprising a plurality of video data elements, each representing a portion of a transmitted video session.

6. The method of claim 1, wherein the playout deadline comprises an end of a predetermined interval that starts at an expected arrival time of the data element.

7. The method of claim 1, wherein the playout deadline comprises an end of a predetermined interval that starts when a previous data element in the data stream is received.

8. The method of claim 1, wherein the decoding comprises releasing the data element to a decoder that decodes the data element and the playout deadline comprises an end of a predetermined interval that starts when a previous data element in the data stream is released to the decoder.

9. The method of claim 1, wherein the playout deadline comprises an end of a predetermined interval that starts when a first data element in the data stream is received.

10. The method of claim 1, wherein the data elements are packets of encoded data.

11. The method of claim 1, wherein the data elements are frames of encoded data.

12. The method of claim 1, wherein the data elements are cells of encoded data.

13. The method of claim 1, further comprising if a data element arrives prior to, or at, the playout deadline, providing the decoded data element to an output element for playout.

14. The method of claim 13, wherein if a data element arrives after the predetermined playout deadline, the data element is not decoded and not provided to the output element for playout.

15. A method of processing communication signals, comprising:
  receiving a transmitted encoded media data stream comprising a plurality of data elements, each data element representing a portion of a transmitted media session;
  if a specified data element arrives prior to, or at, a predetermined playout deadline, performing steps of:
    decoding the data element; and
    providing the data element to a decoder state machine to update a decoder state; and
  if the specified data element fails to arrive prior to, or at, the playout deadline, performing steps of:
    saving a subsequently received data element in memory; and
    if the specified data element arrives after the predetermined playout deadline, providing the specified data element and the saved, subsequently received, data element to the decoder state machine to update the decoder state.

16. The method of claim 15, wherein saving the subsequently received data element in memory comprises saving a plurality of subsequently received data elements in memory, and if the specified data element arrives after the predetermined playout deadline, the specified data element and the saved, subsequently received, data elements are provided to the decoder state machine to update the decoder state.

17. The method of claim 15, wherein saving the subsequently received data element in memory comprises saving all data elements that are received subsequent to the playout deadline but before the arrival of the specified data element, and if the specified data element arrives after the predetermined playout deadline, the specified data element and the saved, subsequently received, data elements are provided to the decoder state machine to update the decoder state.

18. The method of claim 15, wherein if the specified data element arrives after the predetermined playout deadline, the specified data element is not decoded.

19. The method of claim 15, wherein the media data stream is an encoded audio data stream comprising a plurality of audio data elements, each representing a portion of a transmitted audio session.

20. The method of claim 19, wherein the media data stream is an encoded voice data stream comprising a plurality of voice data elements, each representing a portion of a transmitted voice session.

21. The method of claim 15, wherein the media data stream is an encoded video data stream comprising a plurality of video data elements, each representing a portion of a transmitted video session.

22. The method of claim 15, wherein the playout deadline comprises an end of a predetermined interval that starts at an expected arrival time of the specified data element.

23. The method of claim 15, wherein the playout deadline comprises an end of a predetermined interval that starts when a previous data element in the data stream is received.

24. The method of claim 15, wherein the decoding comprises releasing the data element to a decoder that decodes the data element and the playout deadline comprises an end of a predetermined interval that starts when a previous data element in the data stream is released to the decoder.

25. The method of claim 15, wherein the playout deadline comprises an end of a predetermined interval that starts when a first data element in the data stream is received.

26. The method of claim 15, wherein the data elements are packets of encoded data.

27. The method of claim 15, wherein the data elements are frames of encoded data.

28. The method of claim 15, further comprising, if the specified data element arrives prior to, or at, the playout deadline, providing the decoded data element to an output element for playout.

29. The method of claim 28, wherein if the specified data element arrives after the predetermined playout deadline, the specified data element is not decoded and not provided to the output element for playout.

30. A communication system for processing a transmitted encoded media data stream comprising a plurality of data elements, each data element representing a portion of a transmitted media session, the communication system comprising:
  a jitter buffer operable to receive the data stream and to store each data element until a playout deadline for the data element is reached, at which time the data element is provided to a decoder and to a decoder state machine, wherein if the jitter buffer receives a late data element after the playout deadline, the late data element is provided to the decoder state machine;
  a decoder operable to decode media data elements provided by the jitter buffer; and
  a decoder state machine operable to maintain and update a decoder state based on data elements provided by the jitter buffer.

31. The communication system of claim 30, wherein if the jitter buffer receives a data element after the playout deadline, the data element is not decoded.

32. The communication system of claim 30, wherein the media data stream is an encoded audio data stream comprising a plurality of audio data elements, each representing a portion of a transmitted audio session.

33. The communication system of claim 30, wherein the media data stream is an encoded voice data stream comprising a plurality of voice data elements, each representing a portion of a transmitted voice session.

34. The communication system of claim 30, wherein the media data stream is an encoded video data stream comprising a plurality of video data elements, each representing a portion of a transmitted video session.

35. The communication system of claim 30, wherein the playout deadline for each data element comprises an end of a predetermined interval that starts at an expected arrival time of the data element.

36. The communication system of claim 30, wherein the playout deadline for each data element comprises an end of a predetermined interval that starts when a previous data element in the data stream is received by the jitter buffer.

37. The communication system of claim 30, wherein the playout deadline for each data element comprises an end of a predetermined interval that starts when the jitter buffer provides the previous data element in the data stream to the decoder.

38. The communication system of claim 30, wherein the playout deadline for each data element comprises an end of a predetermined interval that starts when the jitter buffer receives a first data element in the data stream.

39. The communication system of claim 30, wherein the data elements are packets of encoded data.

40. The communication system of claim 30, wherein the data elements are frames of encoded data.

41. The communication system of claim 30, further comprising an output element operable to receive decoded data elements from the decoder and to play the media represented by the decoded data elements.

42. The communication system of claim 41, wherein if the jitter buffer receives a data element after the playout deadline, the data element is not decoded and the media represented by the decoded data element is not played.

43. A method of processing communication signals, comprising:

receiving a transmitted encoded media data stream comprising a plurality of data elements, each data element representing a portion of a transmitted media session;

if a late data element is not received by a specified deadline, generating an estimated media sample corresponding to the late data element;

updating a decoder state based on the estimated media sample; and if the late data element is subsequently received after the specified deadline, updating the decoder state based on the late data element.

44. A receiver for processing transmitted media data, comprising:

a decoder operable to decode transmitted media data elements, the decoder being operable to store and update a state of the decoder; and a late data element recovery engine, wherein if a late data element is not received by a specified deadline, the late data element recovery engine is operable to generate an estimated media sample corresponding to the late data element and the decoder is operable to update the decoder state based on the estimated media sample;

wherein if the late data element is subsequently received after the specified deadline, the decoder is operable to update the decoder state based on the late data element.

* * * * *

UNITED STATES PATENT AND TRADEMARK OFFICE
CERTIFICATE OF CORRECTION

PATENT NO. : 8,174,981 B2 Page 1 of 1
APPLICATION NO. : 12/326613
DATED : May 8, 2012
INVENTOR(S) : LeBlanc It is certified that error appears in the above-identified patent and that said Letters Patent is hereby corrected as shown below:

Column 22, line 23, please remove ", performing steps of".

Column 23, line 11, please remove ", performing steps of".

Column 23, line 16, please remove ", performing steps of".

Signed and Sealed this
Seventeenth Day of July, 2012

David J. Kappos
*Director of the United States Patent and Trademark Office*